US012755884B2

(12) United States Patent
Ohta et al.

(10) Patent No.: US 12,755,884 B2
(45) Date of Patent: Oct. 6, 2026

(54) MAGNETIZATION METHOD AND MAGNETIZATION APPARATUS

(71) Applicant: TOYOTA JIDOSHA KABUSHIKI KAISHA, Toyota (JP)

(72) Inventors: Kei Ohta, Toyota (JP); Junichi Deguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/711,660

(22) PCT Filed: Dec. 8, 2022

(86) PCT No.: PCT/JP2022/045203
§ 371 (c)(1),
(2) Date: May 20, 2024

(87) PCT Pub. No.: WO2023/112806
PCT Pub. Date: Jun. 22, 2023

(65) Prior Publication Data

US 2025/0014798 A1 Jan. 9, 2025

(30) Foreign Application Priority Data

Dec. 16, 2021 (JP) ................................. 2021-204619

(51) Int. Cl.
*H01F 13/00* (2006.01)
*H02K 1/2792* (2022.01)

(52) U.S. Cl.
CPC ......... *H01F 13/003* (2013.01); *H02K 1/2792* (2022.01)

(58) Field of Classification Search
CPC ..... H01F 13/003; H01F 13/00; H02K 1/2792; H02K 15/038
(Continued)

(56) References Cited

U.S. PATENT DOCUMENTS

2003/0094873 A1* 5/2003 Kim .................... H02K 1/2783 310/156.43
2022/0181954 A1 6/2022 Tanaka et al.

FOREIGN PATENT DOCUMENTS

EP 2 312 732 A2 4/2011
JP 11-308793 A 11/1999
(Continued)

OTHER PUBLICATIONS

English Translation of JP2020129888A (Year: 2020).*

*Primary Examiner* — Terrance L Kenerly
*Assistant Examiner* — Theodore L Perkins
(74) *Attorney, Agent, or Firm* — Sughrue Mion, PLLC

(57) ABSTRACT

A magnetization method capable of magnetizing a magnetic material in such a manner that the magnetic material produces a magnetic orientation in a direction inclined from a predetermined direction is provided. A magnetization method includes: a step of arranging a plurality of magnetic material pieces so that they includes a magnetic material piece that can produce a magnetic orientation in a direction inclined from a predetermined direction; a first magnetization step of magnetizing a magnetic material piece disposed between the first and second magnetization parts that form a magnetic path through the magnetic material piece that can produce the magnetic orientation in the direction inclined from the second direction; and a second magnetization step of magnetizing the magnetic material piece that can produce the magnetic orientation in the predetermined direction.

7 Claims, 4 Drawing Sheets

(58) Field of Classification Search
USPC .................................................... 310/156.43
See application file for complete search history.

(56) References Cited

FOREIGN PATENT DOCUMENTS

| | | | | |
|---|---|---|---|---|
| JP | 2020129888 | A | * | 8/2020 |
| JP | 2021-093899 | A | | 6/2021 |
| WO | 2020/195005 | A1 | | 10/2020 |

* cited by examiner

MAGNETIZATION METHOD AND MAGNETIZATION APPARATUS

CROSS REFERENCE TO RELATED APPLICATIONS

This application is a National Stage of International Application No. PCT/JP2022/045203 filed Dec. 8, 2022, claiming priority based on Japanese Patent Application No. 2021-204619 filed Dec. 16, 2021.

TECHNICAL FIELD

The present disclosure relates to a magnetization method and a magnetization apparatus, and for example, to a method and an apparatus for magnetizing a plurality of magnetic material pieces arranged in a first direction in order to form a Halbach array magnet.

BACKGROUND ART

Recently, rotors and the like including Halbach array magnets have been commercially used. As disclosed in Patent Literature 1, for example, a Halbach array comprises main magnets which produce a magnetic orientation in the radial direction of the rotor (i.e., in a predetermined direction) and auxiliary magnets which produce a magnetic orientation in a direction perpendicular to the magnetic orientation of the main magnets, in which the main magnets and the auxiliary magnets are arranged in an alternate manner.

CITATION LIST

Patent Literature

Patent Literature 1: Japanese Unexamined Patent Application Publication No. H11-308793

SUMMARY OF INVENTION

Technical Problem

The applicant of the present disclosure has found the following problem. In general, it is difficult to magnetize a magnetic material in such a manner that its magnetic orientation is inclined from a predetermined direction.

The present disclosure has been made in view of the above-described problem and provides a magnetization method and a magnetization apparatus capable of magnetizing a magnetic material in such a manner that the magnetic material produces a magnetic orientation in a direction inclined from a predetermined direction.

Solution to Problem

A magnetization method according to an aspect of the present disclosure is a method for magnetizing a plurality of magnetic material pieces arranged in a first direction in order to form a Halbach array magnet, including:

a step of arranging the plurality of magnetic material pieces so that the plurality of magnetic material pieces includes at least one magnetic material piece that can produce a magnetic orientation in a direction inclined from a second direction perpendicular to the first direction;

a first magnetization step of arranging, in one of areas sandwiching the plurality of magnetic material pieces in the second direction, a first magnetization part and a second magnetization part with a space therebetween in the first direction, and forming a magnetic path between the first and second magnetization parts through the magnetic material piece that can produce the magnetic orientation in the direction inclined from the second direction and thereby magnetizing the magnetic material piece disposed between the first and second magnetization parts; and a second magnetization step of disposing a third magnetization part in one of areas sandwiching the plurality of magnetic material pieces, and forming a magnetic path through, among the plurality of magnetic material pieces, a magnetic material piece that can produce a magnetic orientation in the second direction and thereby magnetizing the magnetic material piece that can produce the magnetic orientation in the second direction.

In the above-described magnetization method, one of the first and second magnetization parts is preferably disposed so as to project, as viewed in the second direction, from the magnetic material piece that can produce the magnetic orientation in the direction inclined from the second direction toward the other of the first and second magnetization parts.

In the above-described magnetization method, a magnetic material piece is preferably disposed in one of the areas sandwiching the plurality of magnetic material pieces different from the one where the first and second magnetization parts are arranged in such a manner that this magnetic material piece is, in the second direction, opposed to the magnetic material piece that can produce the magnetic orientation in the direction inclined from the second direction.

In the above-described magnetization method, the magnetic material pieces that can produce the magnetic orientation in the direction inclined from the second direction are preferably arranged with a space therebetween in the first direction.

In the above-described magnetization method, a fourth magnetization part is preferably disposed in one of the areas sandwiching the plurality of magnetic material pieces different from the one where the third magnetization part is disposed in such a manner that the fourth magnetic material part is opposed to the third magnetization part in the second direction.

In the above-described magnetization method, a magnetic flux loop is preferably formed between the first and second magnetization parts through the magnetic material piece that can produce the magnetic orientation in the direction inclined from the second direction.

In the above-described magnetization method, the third magnetization parts are preferably arranged with a space therebetween in the first direction, and the space between the third magnetization parts in the first direction is preferably wider than the space between the first and second magnetization parts in the first direction.

In the above-described magnetization method, the first direction is preferably a predetermined axial direction or a predetermined circumferential direction.

A magnetization apparatus according to an aspect of the present disclosure is an apparatus for magnetizing a plurality of magnetic material pieces arranged in a first direction in order to form a Halbach array magnet, including:

a first magnetization part and a second magnetization part arranged with a space therebetween in the first direction, in a state in which the plurality of magnetic material pieces are arranged so that the plurality of magnetic material pieces includes at least one magnetic material piece that can produce a magnetic orientation in a direction inclined from a second direction perpendicular to the first direction, in one of areas sandwiching the plurality of magnetic material pieces in the second direction so that a magnetic path is formed through the magnetic material piece that can produce the magnetic orientation in the direction inclined from the second direction; and a third magnetization part disposed in one of areas sandwiching the plurality of magnetic material pieces so that a magnetic path is formed through, among the plurality of magnetic material pieces, a magnetic material piece that can produce a magnetic orientation in the second direction.

The above-described magnetization apparatus preferably further includes a magnetic material piece disposed in one of the areas sandwiching the plurality of magnetic material pieces different from the one where the first and second magnetization parts are arranged in such a manner that this magnetic material piece is, in the second direction, opposed to the magnetic material piece that can produce the magnetic orientation in the direction inclined from the second direction.

The above-described magnetization apparatus preferably further includes a fourth magnetization part disposed in one of the areas sandwiching the plurality of magnetic material pieces different from the one where the third magnetization part is disposed in such a manner that the fourth magnetic material part is opposed to the third magnetization part in the second direction.

Advantageous Effects of Invention

According to the present disclosure, it is possible to provide a magnetization method and a magnetization apparatus capable of magnetizing a magnetic material in such a manner that the magnetic material produces a magnetic orientation in a direction inclined from a predetermined direction.

DESCRIPTION OF EMBODIMENTS

Specific embodiments to which the present disclosure is applied will be described hereinafter in detail with reference to the drawings. However, the present disclosure is not limited to the below-shown embodiments. Further, for clarifying the explanation, the following description and the drawings are simplified as appropriate.

First Embodiment

Figure 1:
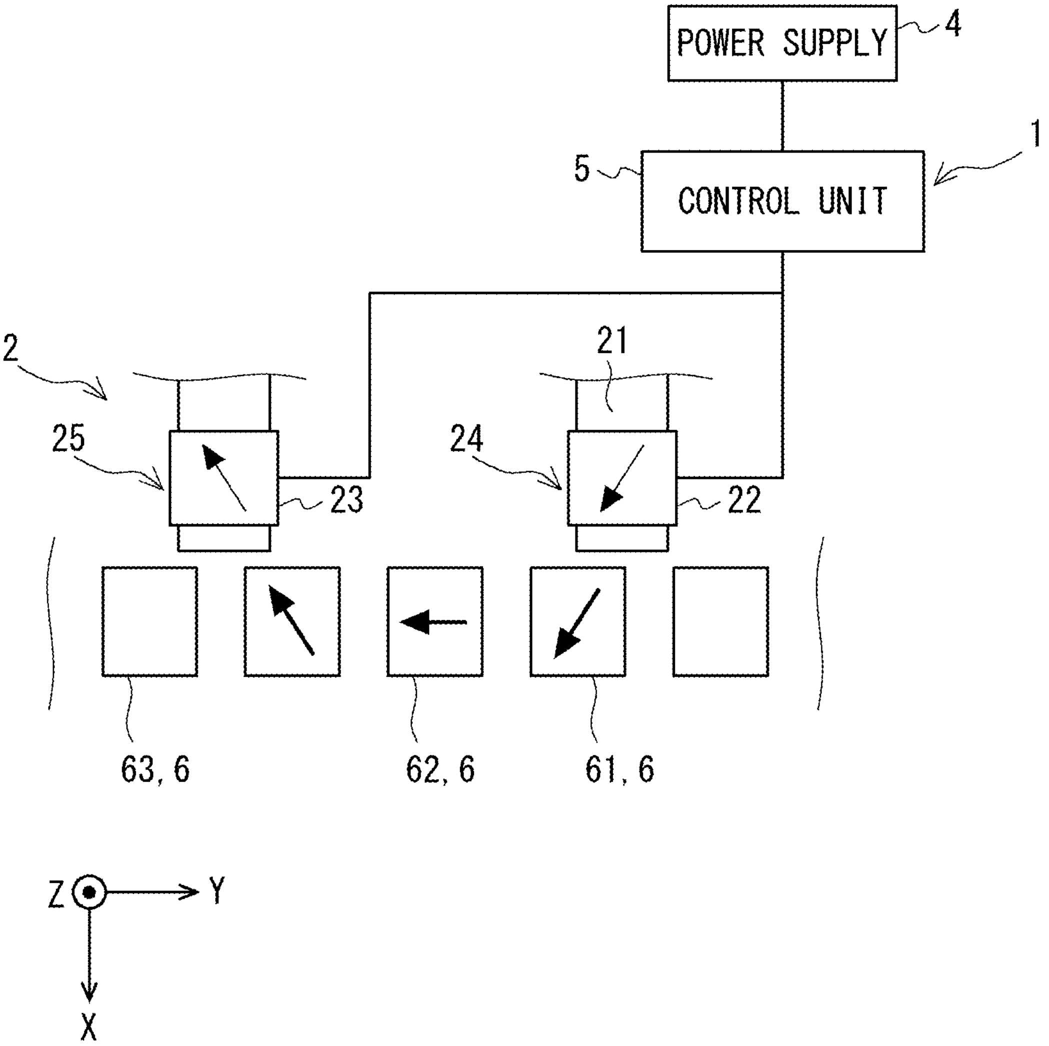
FIG. 1 shows a state in which a first magnetization step is performed on magnetic material pieces by using a magnetization apparatus according to a first embodiment.
Figure 2:
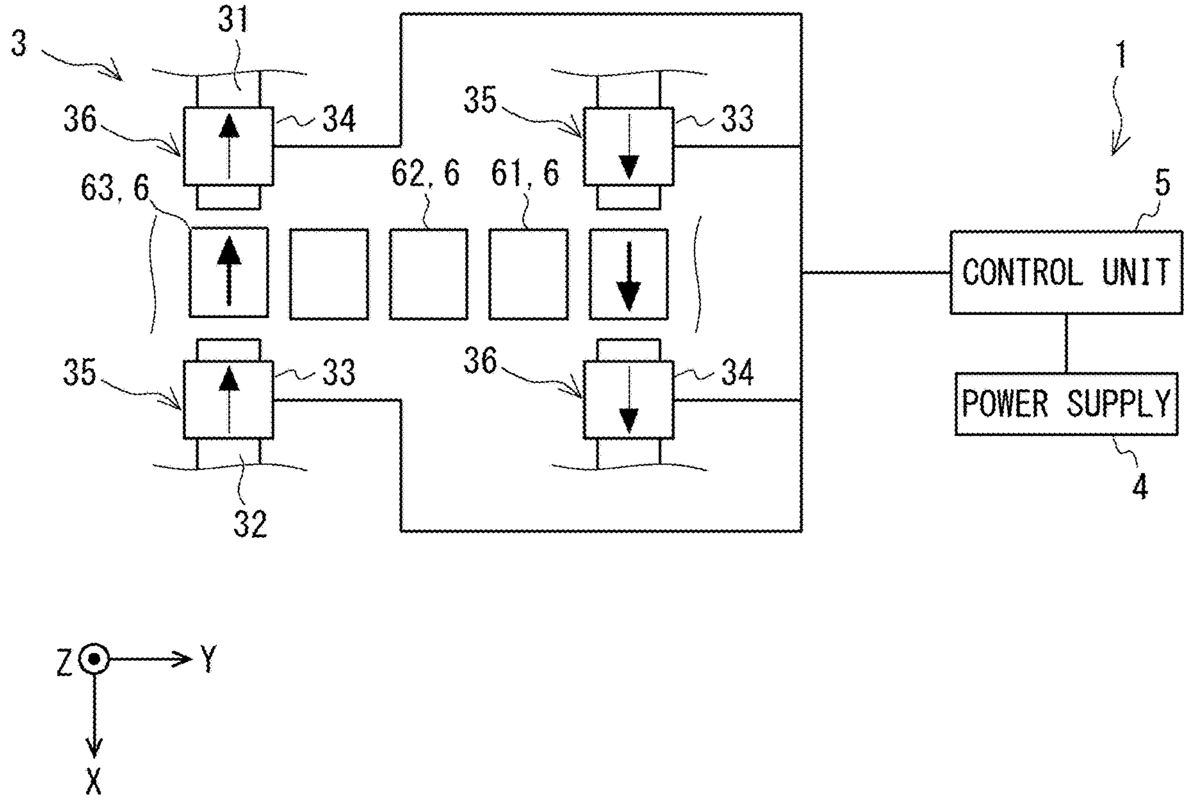
FIG. 2 shows a state in which a second magnetization step is performed on the magnetic material pieces by using the magnetization apparatus according to the first embodiment.

Firstly, a configuration of a magnetization apparatus according to an embodiment will be described. FIG. 1 shows a state in which a first magnetization step is performed on magnetic material pieces by using the magnetization apparatus according to this embodiment. FIG. 2 shows a state in which a second magnetization step is performed on the magnetic material pieces by using the magnetization apparatus according to this embodiment.

Figure 4:
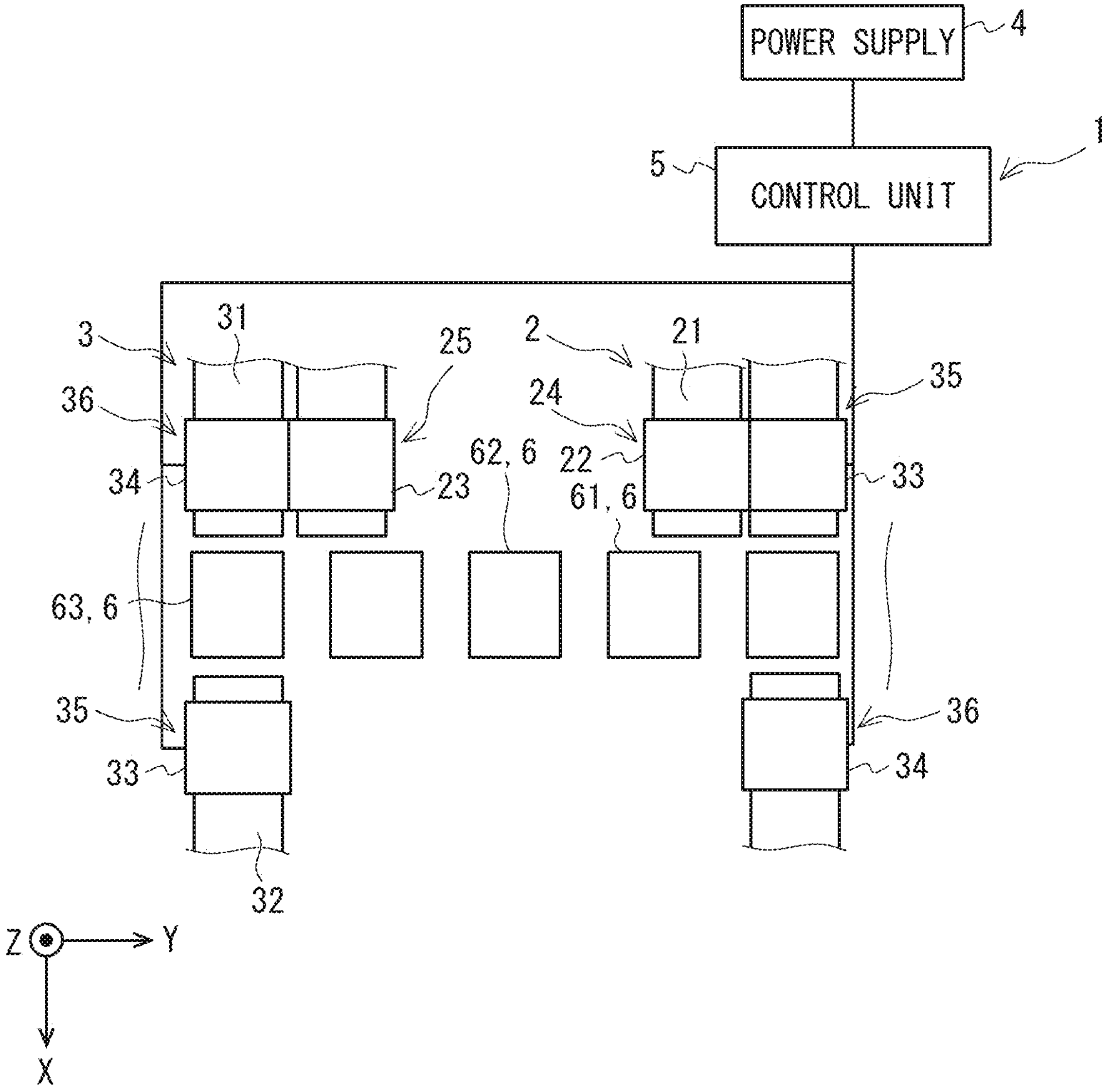
FIG. 4 shows a state in which a first magnetizer used in a first magnetizing step and a second magnetizer used in a second magnetizing step are shown simultaneously according to a first embodiment.

Note that in FIGS. 1 and 2, only a part of a magnetization apparatus 1 and some of magnetic material pieces 6 to be magnetized are shown in a simplified manner. FIG. 4 shows a more expansive view of the magnetization apparatus according to the first embodiment. Note that in the following description, a three-dimensional (XYZ) coordinate system will be used to clarify the explanation.

As shown in FIGS. 1, and 4, the magnetization apparatus 1 according to this embodiment includes, for example, a first magnetizer 2, a second magnetizer 3, a power supply 4, and a control unit 5. The first magnetizer 2 is used to carry out a first magnetization step as described later. As shown in FIG. 1, the first magnetizer 2 includes a magnetization yoke 21, a first coil 22, and a second coil 23.

As shown in FIG. 1, the magnetization yoke 21 is, for example, a magnetic material having a comb-like shape in which its X-axis positive side is opened. However, the magnetization yoke 21, which will be described later in detail, may have any shape as long as, for example, it can form a magnetic flux loop, in a state in which first magnetic material pieces 61 that can produce a magnetic orientation in a direction inclined from the X-axis direction are arranged with spaces therebetween in the Y-axis direction, through these first magnetic material pieces 61.

The first coil 22 is wound around one of a pair of X-axis extending parts of the magnetization yoke 21 adjacent to each other. The second coil 23 is wound around the other of the pair of X-axis extending parts of the magnetization yoke 21 adjacent to each other.

By the above-described configuration, as shown in FIG. 1, a first magnetizing part 24 is formed by the one of the pair of X-axis extending parts of the magnetization yoke 21 adjacent to each other and the first coil 22, and a second magnetizing part 25 is formed by the other of the pair of X-axis extending parts of the magnetization yoke 21 adjacent to each other and the second coil 23.

The second magnetizer 3 is used to carry out a second magnetization step as described later. As shown in FIG. 2, the second magnetizer 3 includes a first magnetization yoke 31, a second magnetization yoke 32, a first coil 33, and a second coil 34.

As shown in FIG. 2, the first magnetization yoke 31 is, for example, a magnetic material having a comb-like shape in which its X-axis positive side is opened. The second magnetization yoke 32 is, for example, a magnetic material that has a shape axially symmetric with the first magnetization yoke 31 with the Y-axis being the symmetry axis, and has a comb-like shape in which its X-axis negative side is opened.

However, each of the first and second magnetization yokes 31 and 32, which will be described later in detail, may have any shape as long as, for example, they can form a magnetic path in the X-axis direction, in a state in which third magnetic material pieces 63 that can produce a magnetic orientation in the X-axis direction are arranged with spaces therebetween in the Y-axis direction, through the respective third magnetic material pieces 63.

The first coil 33 is wound around one of the X-axis extending part of the first magnetization yoke 31 and the X-axis extending part of the second magnetization yoke 32 that is opposed to the X-axis extending part of the first magnetization yoke 31 in the X-axis direction.

The second coil 34 is wound around the other of the X-axis extending part of the first magnetization yoke 31 and the X-axis extending part of the second magnetization yoke 32 that is opposed to the X-axis extending part of the first magnetization yoke 31 in the X-axis direction. Note that the first and second coils 33 and 34 are arranged in an alternate manner in the Y-axis direction.

By the above-described configuration, as shown in FIG. 2, a third magnetizing part 35 is formed by the one of the first and second magnetization yokes 31 and 32 and the first coil 33, and a fourth magnetizing part 36 is formed by the other of the first and second magnetization yokes 31 and 32 and the second coil 34. The above-described third and fourth magnetization parts 35 and 36 are opposed to each other in the X-axis direction.

Note that in the Y-axis direction, the space between the third magnetizing part 35 disposed in the area on the X-axis positive side of the plurality of magnetic material pieces 6 in the second magnetizer 3 and the third magnetizing part 35 disposed in the area on the X-axis negative side thereof (i.e., the space between the third and fourth magnetization parts 35 and 36 adjacent to each other) is wider than the space between the first and second magnetization parts 24 and 25 of the first magnetizer 2.

The power supply 4 discharges an electrical charge charged in a capacitor provided in the power supply 4 to the first coil 22 of the first magnetizing part 24 and the second coil 23 of the second magnetizing part 25 of the first magnetizer 2, and to the first coil 33 of the third magnetizing part 35 and the second coil 34 of the fourth magnetizing part 36 of the second magnetizer 3. As a result, the first and second magnetization parts 24 and 25 generates magnetic fields having different polarities. Further, the third and fourth magnetization parts 35 and 36 generates magnetic fields having different polarities.

The control unit 5 controls, for example, the power supply 4. Specifically, the control unit 5 performs switching as to whether the electrical charge charged in the capacitor of the power supply 4 should be discharged to the first coil 22 of the first magnetizing part 24 and the second coil 23 of the second magnetizing part 25 of the first magnetizer 2, or to the first coil 33 of the third magnetizing part 35 and the second coil 34 of the fourth magnetizing part 36 of the second magnetizer 3.

Next, a flow of a magnetization method according to this embodiment will be described. Firstly, for example, as shown in FIG. 1, as magnetic material pieces 6 to be magnetized, first magnetic material pieces 61 that can produce a magnetic orientation in a direction inclined from the X-axis direction (e.g., a direction inclined approximately 45° from the X-axis), second magnetic material pieces 62 that can produce a magnetic orientation in the Y-axis direction, and third magnetic material pieces 63 that can produce a magnetic orientation in the X-axis direction are arranged (arrayed) in the Y-axis direction.

Note that although each of the first magnetic material pieces 61, the second magnetic material pieces 62, and the third magnetic material pieces 63 is substantially rectangular as viewed in the Z-axis direction in FIGS. 1 and 2, the shapes of the first magnetic material pieces 61, the second magnetic material pieces 62, and the third magnetic material pieces 63 can be changed as desired.

Specifically, the first magnetic material pieces 61 are arranged with spaces therebetween in the Y-axis direction. Note that, for example, as first magnetic material pieces 61 disposed on the Y-axis positive side, magnetic material pieces that can produce a magnetic orientation in a direction inclined clockwise from the X-axis direction as viewed from the Z-axis positive side are arranged, and as first magnetic material pieces 61 disposed on the Y-axis negative side, magnetic material pieces that can produce a magnetic orientation in a direction inclined counterclockwise from the X-axis direction as viewed from the Z-axis positive side are arranged.

The second magnetic material pieces 62 are arranged between the first magnetic material pieces 61 in the Y-axis direction. The third magnetic material pieces 63 are arranged on the outer side of a pair of first magnetic material pieces 61 in the Y-axis direction. That is, one third magnetic material piece 63 is disposed on each of the Y-axis positive and negative sides of a pair of magnetic material pieces 61.

For example, by arranging first magnetic material pieces 61, second magnetic material pieces 62, and third magnetic material pieces 63 arranged in the Y-axis direction as described above in a repetitive manner in the Y-axis direction, a plurality of magnetic material pieces 6 can be arranged.

Next, a first magnetization step is carried out on the first magnetic material pieces 61 and the second magnetic material pieces 62 by using the first magnetizer 2 of the magnetization apparatus 1. Specifically, as shown in FIG. 1, the first magnetizing part 24 of the first magnetizer 2 is disposed near the first magnetic material pieces 61 disposed on the Y-axis positive side, and the second magnetizing part 25 of the first magnetizer 2 is disposed near the first magnetic material pieces 61 disposed on the Y-axis negative side in the area on the X-axis negative side of the arranged magnetic material pieces 6 so that a magnetic path, i.e., a magnetic flux loop, is formed by the first magnetizer 2, the first magnetic material pieces 61 disposed on the Y-axis positive side, the second magnetic material pieces 62, and the first magnetic material pieces 61 disposed on the Y-axis negative side.

Note that the first magnetizing part 24 of the first magnetizer 2 is preferably disposed so as to project, as viewed in the X-axis direction, from the first magnetic material pieces 61 disposed on the Y-axis positive side to the Y-axis positive side (its detailed functions and effects will be described later).

Further, the second magnetizing part 25 of the first magnetizer 2 is preferably disposed so as to project, as viewed in the X-axis direction, from the first magnetic material pieces 61 disposed on the Y-axis negative side to the Y-axis negative side. For example, the first and second magnetization parts 24 and 25 of the first magnetizer 2 preferably straddle the first magnetic material pieces 61 and the third magnetic material pieces 63 as viewed in the X-axis direction.

Further, the control unit 5 controls the power supply 4 and thereby discharges an electrical charge to the first and second coils 22 and 23 of the first magnetizer 2. As a result, for example, a magnetic path is formed as indicated by arrows in FIG. 1, and the first magnetic material pieces 61 disposed on the Y-axis positive side, the second magnetic material pieces 62, and the first magnetic material pieces 61 disposed on the Y-axis negative side are thereby magnetized.

In this state, since the first magnetic material pieces 61 disposed on the Y-axis positive side have such characteristics that they produce a magnetic orientation in a direction inclined clockwise from the X-axis direction as viewed from the Z-axis positive side, they form, for example, a magnet that produces such a magnetic orientation that the more it is positioned on the X-axis positive side, the more its magnetic orientation points to the Y-axis negative side.

Further, since the second magnetic material pieces 62 have such characteristics that they produce a magnetic orientation in the Y-axis direction, they form, for example, a magnet that produces a magnetic orientation pointing to the Y-axis negative side. Further, since the first magnetic material pieces 61 disposed on the Y-axis negative side have such characteristics that they produce a magnetic orientation in a direction inclined counterclockwise from the X-axis direction as viewed from the Z-axis positive side, they form, for example, a magnet that produces such a magnetic orientation that the more it is positioned on the X-axis negative side, the more its magnetic orientation points to the Y-axis negative side.

Note that when the first magnetizing part 24 of the first magnetizer 2 is disposed so as to project from the first magnetic material pieces 61 disposed on the Y-axis positive side to the Y-axis positive side, and the second magnetizing part 25 of the first magnetizer 2 is disposed so as to project from the first magnetic material pieces 61 disposed on the Y-axis negative side to the Y-axis negative side, it is possible to form a magnetic flux loop larger than that which is formed when the first magnetizing part 24 of the first magnetizer 2 is disposed so as to be opposed to the first magnetic material pieces 61 disposed on the Y-axis positive side and the second magnetizing part 25 of the first magnetizer 2 is disposed so as to be opposed to the first magnetic material pieces 61 disposed on the Y-axis negative side.

Therefore, it is possible to magnetize a part located on the Y-axis positive side of the first magnetic material pieces 61 disposed on the Y-axis positive side and on the X-axis positive side, and a part located on the Y-axis negative side of the first magnetic material pieces 61 disposed on the Y-axis negative side and on the X-axis positive side, which are parts where the magnetic flux loop is less likely to reach, in a satisfactory manner.

Next, a second magnetization step is carried out on the third magnetic material pieces 63 by using the second magnetizer 3 of the magnetization apparatus 1. Specifically, for example, the third magnetizing part 35 of the second magnetizer 3 is disposed in the area on the X-axis negative side of the magnetic material pieces 63 disposed on the Y-axis positive side; the fourth magnetizing part 36 of the second magnetizer 3 is disposed in the area on the X-axis positive side of the third magnetic material pieces 63 disposed on the Y-axis positive side; and the third and fourth magnetization parts 35 and 36 are opposed to each other with the third magnetic material pieces 63 disposed on the Y-axis positive side interposed therebetween. By this configuration, a magnetic path to the X-axis positive side is formed through the third magnetic material pieces 63 disposed on the Y-axis positive side.

Further, for example, the third magnetizing part 35 of the second magnetizer 3 is disposed in the area on the X-axis positive side of the magnetic material pieces 63 disposed on the Y-axis negative side; the fourth magnetizing part 36 of the second magnetizer 3 is disposed in the area on the X-axis negative side of the third magnetic material pieces 63 disposed on the Y-axis negative side; and the third and fourth magnetization parts 35 and 36 are opposed to each other with the third magnetic material pieces 63 disposed on the Y-axis negative side interposed therebetween. By this configuration, a magnetic path to the X-axis negative side is formed through the third magnetic material pieces 63 disposed on the Y-axis negative side.

Further, the control unit 5 controls the power supply 4 and thereby discharges the electrical charge to the first and second coils 33 and 34 of the second magnetizer 3. As a result, for example, a magnetic path is formed as indicated by arrows in FIG. 2, and the third magnetic material pieces 63 disposed on the Y-axis positive side and the third magnetic material pieces 63 disposed on the Y-axis negative side are thereby magnetized.

In this state, since the third magnetic material pieces 63 disposed on the Y-axis positive side have such characteristics that they produce a magnetic orientation in the X-axis direction, they form, for example, a magnet that produces a magnetic orientation pointing to the X-axis positive side. Further, since the third magnetic material pieces 63 disposed on the Y-axis negative side have such characteristics that they produce a magnetic orientation in the X-axis direction, they form, for example, a magnet that produces a magnetic orientation pointing to the X-axis negative side. In this way, it is possible to form the plurality of magnetic material pieces 6 (i.e., the first magnetic material pieces 61, the second magnetic material pieces 62, and the third magnetic material pieces 63) as a Halbach array magnet.

As describe above, in the magnetization method and the magnetization apparatus 1 according to this embodiment, the first and second magnetization parts 24 and 25 of the first magnetizer 2 are arranged with spaces therebetween in the Y-axis direction in the area on the X-axis negative side of the plurality of magnetic material pieces 6; a magnetic path is formed between the first and second magnetization parts 24 and 25 through the first magnetic material pieces 61 that can produce a magnetic orientation in a direction inclined from the X-axis direction; and the first and second magnetic material pieces 61 and 62 disposed between the first and second magnetization parts 24 and 25 are magnetized. Therefore, it is possible to magnetize the first magnetic material pieces 61 so that they produce a magnetic orientation inclined from the X-axis direction in a satisfactory manner.

In addition, when the first magnetizing part 24 of the first magnetizer 2 is disposed so as to project from the first magnetic material pieces 61 disposed on the Y-axis positive side to the Y-axis positive side, and the second magnetizing part 25 of the first magnetizer 2 is disposed so as to project from the first magnetic material pieces 61 disposed on the Y-axis negative side to the Y-axis negative side, it is possible to form a magnetic flux loop larger than that which is formed when the first magnetizing part 24 of the first magnetizer 2 is disposed so as to be opposed to the first magnetic material pieces 61 disposed on the Y-axis positive side and the second magnetizing part 25 of the first magnetizer 2 is disposed so as to be opposed to the first magnetic material pieces 61 disposed on the Y-axis negative side. Therefore, it is possible to magnetize a part located on the Y-axis positive side of the first magnetic material pieces 61 disposed on the Y-axis positive side and on the X-axis positive side, and a part located on the Y-axis negative side of the first magnetic material pieces 61 disposed on the Y-axis negative side and on the X-axis positive side, which are parts where the magnetic flux loop is less likely to reach, in a satisfactory manner.

Further, in this embodiment, since the second magnetizer 3 includes the fourth magnetizing part 36, it is possible to, for example, form a large magnetic path with an amount of electrical charge smaller than that is used when the fourth magnetizing part 36 is not provided, and thereby to efficiently magnetize the third magnetic material pieces 63. However, the fourth magnetizing part 36 of the second magnetizer 3 is not indispensable.

Second Embodiment

Figure 3:
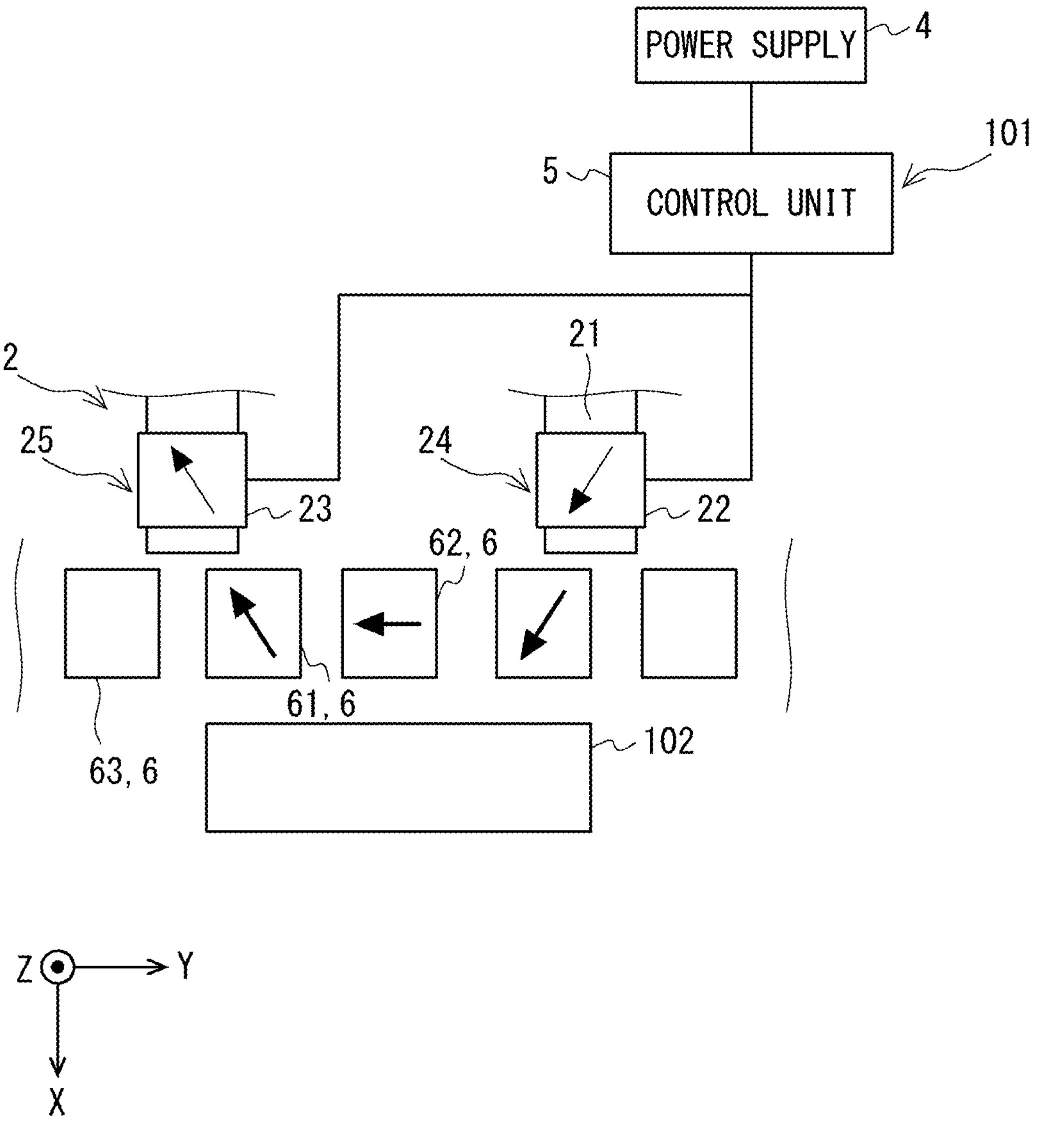
FIG. 3 shows a state in which a first magnetization step is performed on magnetic material pieces by using a magnetization apparatus according to a second embodiment.

FIG. 3 shows a state in which a first magnetization step is performed on magnetic material pieces by using a magnetization apparatus according to this embodiment. A magnetization apparatus 101 and a magnetization method according to this embodiment have a configuration roughly equivalent to that of the magnetization apparatus 1 and the magnetization method according to the first embodiment, and therefore redundant descriptions thereof will be omitted, and the same or similar members and the like are described by using the same or similar reference numbers (or symbols).

As shown in FIG. 3, the magnetization apparatus 101 according to this embodiment includes, in addition to the magnetization apparatus 1 according to the first embodiment, a magnetic material 102 disposed in an area on the X-axis positive side of the plurality of magnetic material pieces 6 when the first magnetization step is carried out. The magnetic material 102 is disposed, for example, so as to be roughly opposed to the first magnetic material pieces 61 during the first magnetization step.

Note that as shown in FIG. 3, roughly speaking, the magnetic material 102 may be disposed so as to cover the first magnetic material pieces 61 disposed on the Y-axis positive side, the second magnetic material pieces 62, and the first magnetic material pieces 61 disposed on the Y-axis negative side in the area on the X-axis positive side of the plurality of magnetic material pieces 6 as viewed in the X-axis direction.

That is, the magnetic material 102 is preferably disposed in such a manner that the magnetic material 102 covers, from one of the areas sandwiching the plurality of magnetic material pieces 6 different from the one where the first magnetizer 2 is disposed, the entire area from the end on the Y-axis positive side of the plurality of magnetic material pieces 6, which form a magnetic path with the first and second magnetization parts 24 and 25, to the end on the Y-axis negative side thereof. In this way, it is possible to form a magnetic flux loop larger than that which is formed when the magnetic material 102 is not provided.

Therefore, it is possible to magnetize a part located on the Y-axis positive side of the first magnetic material pieces 61 disposed on the Y-axis positive side and on the X-axis positive side, and a part located on the Y-axis negative side of the first magnetic material pieces 61 disposed on the Y-axis negative side and on the X-axis positive side, which are parts where the magnetic flux loop is less likely to reach, in a satisfactory manner.

The present disclosure is not limited to the above-described embodiments, and they can be modified as appropriate without departing from the scope and spirit of the disclosure.

For example, although the first magnetic material pieces 61 disposed on the Y-axis positive side, the second magnetic material pieces 62, and the first magnetic material pieces 61 disposed on the Y-axis negative side are arranged in order to form the so-called auxiliary magnet of a Halbach array magnet in the above-described embodiments, the number of magnetic material pieces 6 can be changed as desired. Further, the magnetic orientations in the above-described embodiments are merely examples, and can be changed as desired. Further, the magnet array is not limited to linear arrays, and the present disclosure may be applied to annular arrays such as those of inner rotors or outer rotors.

For example, although the magnetic material pieces 6 are arranged in the Y-axis direction, i.e., in one axial direction in the above-described embodiments, the direction in which the magnetic material pieces 6 are arranged is not limited to one axial direction. That is, magnetic material pieces 6 may be arranged in a circumferential direction of a circle centered at a predetermined position.

For example, the first and second magnetization parts of the first magnetizer 2 may be used as the third and fourth magnetization parts arranged in one of the areas sandwiching the plurality of magnetic material pieces 6 in the second magnetizer 3. That is, common magnetization parts may be used as both the first and second magnetization parts of the first magnetizer 2 and the third and fourth magnetization parts arranged in one of the areas sandwiching the plurality of magnetic material pieces 6 in the second magnetizer 3. In this case, the magnetization yoke 21 of the first magnetizer 2 may be configured so that it can be expanded/contracted in the Y-axis direction.

For example, although the common power supply 4 and control unit 5 are used for both the first magnetizer 2 and the second magnetizer 3 in the above-described embodiments, an individual (i.e., dedicated) power supply and control unit may be used for each of them.

This application is based upon and claims the benefit of priority from Japanese patent application No. 2021-204619, filed on Dec. 16, 2021, the disclosure of which is incorporated herein in its entirety by reference.

REFERENCE SIGNS LIST

1 MAGNETIZATION APPARATUS
2 FIRST MAGNETIZER
21 MAGNETIZATION YOKE
22 FIRST COIL
23 SECOND COIL
24 FIRST MAGNETIZATION PART
25 SECOND MAGNETIZATION PART
3 SECOND MAGNETIZER
31 FIRST MAGNETIZATION YOKE
32 SECOND MAGNETIZATION YOKE
33 FIRST COIL
34 SECOND COIL
35 THIRD MAGNETIZATION PART
36 FOURTH MAGNETIZATION PART
4 POWER SUPPLY
5 CONTROL UNIT
6 MAGNETIC MATERIAL PIECE
61 FIRST MAGNETIC MATERIAL PIECE
62 SECOND MAGNETIC MATERIAL PIECE
63 THIRD MAGNETIC MATERIAL PIECE
101 MAGNETIZATION APPARATUS
102 MAGNETIC MATERIAL

The invention claimed is:

1. A method for magnetizing a plurality of magnetic material pieces arranged in a first direction in order to form a Halbach array magnet, comprising a step of arranging the plurality of magnetic material pieces so that the plurality of magnetic material pieces includes at least one magnetic material piece that can produce a magnetic orientation in a direction inclined from a second direction perpendicular to the first direction;

a first magnetization step of arranging, in one of areas sandwiching the plurality of magnetic material pieces in the second direction, a first magnetization part and a second magnetization part with a space therebetween in the first direction, and forming a magnetic path between the first and second magnetization parts through the magnetic material piece that can produce the magnetic orientation in the direction inclined from the second direction and thereby magnetizing the magnetic material piece disposed between the first and second magnetization parts; and a second magnetization step of disposing a third magnetization part in one of areas sandwiching the plurality of magnetic material pieces, and forming a magnetic path through, among the plurality of magnetic material pieces, a magnetic material piece that can produce a magnetic orientation in the second direction and thereby magnetizing the magnetic material piece that can produce the magnetic orientation in the second direction; wherein a magnetic material piece is disposed in one of the areas sandwiching the plurality of magnetic material pieces different from the one where the first and second magnetization parts are arranged in such a manner that this magnetic material piece is, in the second direction, opposed to the magnetic material piece that can produce the magnetic orientation in the direction inclined from the second direction, a fourth magnetization part is disposed in one of the areas sandwiching the plurality of magnetic material pieces different from the one where the third magnetization part is disposed in such a manner that the fourth magnetization part is opposed to the third magnetization part in the second direction, and a space between the third magnetization part and the fourth magnetization part disposed in one of the areas sandwiching the plurality of magnetic material pieces in the first direction is wider than a space between the first magnetization part and the second magnetization part disposed in the same area as the third and fourth magnetization parts.

2. The magnetization method according to claim 1, wherein one of the first and second magnetization parts is disposed so as to project, as viewed in the second direction, from the magnetic material piece that can produce the magnetic orientation in the direction inclined from the second direction toward the other of the first and second magnetization parts.

3. The magnetization method according to claim 1, wherein the magnetic material pieces that can produce the magnetic orientation in the direction inclined from the second direction are arranged with a space therebetween in the first direction.

4. The magnetization method according to claim 1, wherein a magnetic flux loop is formed between the first and second magnetization parts through the magnetic material piece that can produce the magnetic orientation in the direction inclined from the second direction.

5. The magnetization method according to claim 1, wherein the third magnetization parts are arranged with a space therebetween in the first direction, and the space between the third magnetization parts in the first direction is wider than the space between the first and second magnetization parts in the first direction.

6. The magnetization method according to claim 1, wherein the first direction is a predetermined axial direction or a predetermined circumferential direction.

7. An apparatus for magnetizing a plurality of magnetic material pieces arranged in a first direction in order to form a Halbach array magnet, comprising:

a first magnetization part and a second magnetization part arranged with a space therebetween in the first direction, in a state in which the plurality of magnetic material pieces are arranged so that the plurality of magnetic material pieces includes at least one magnetic material piece that can produce a magnetic orientation in a direction inclined from a second direction perpendicular to the first direction, in one of areas sandwiching the plurality of magnetic material pieces in the second direction so that a magnetic path is formed through the magnetic material piece that can produce the magnetic orientation in the direction inclined from the second direction;

a third magnetization part disposed in one of areas sandwiching the plurality of magnetic material pieces so that a magnetic path is formed through, among the plurality of magnetic material pieces, a magnetic material piece that can produce a magnetic orientation in the second direction;

a fourth magnetization part disposed in one of the areas sandwiching the plurality of magnetic material pieces different from the one where the third magnetization part is disposed in such a manner that the fourth magnetization part is opposed to the third magnetization part in the second direction; and a magnetic material piece disposed in one of the areas sandwiching the plurality of magnetic material pieces different from the one where the first and second magnetization parts are arranged in such a manner that this magnetic material piece is, in the second direction, opposed to the magnetic material piece that can produce the magnetic orientation in the direction inclined from the second direction, wherein a space between the third magnetization part and the fourth magnetization part disposed in one of the areas sandwiching the plurality of magnetic material pieces in the first direction is wider than space between the first magnetization part and the second magnetization part disposed in the same area as the third and fourth magnetization parts.

* * * * *